United States Patent
Fritzsche et al.

(10) Patent No.: US 9,476,396 B2
(45) Date of Patent: Oct. 25, 2016

(54) LOCKING DEVICE FOR WIND TURBINES

(75) Inventors: Mario Fritzsche, Potsdam (DE); Frank Schorer, Potsdam (DE)

(73) Assignee: SUZLON ENERGY GMBH, Rostock (DE)

( * ) Notice: Subject to any disclaimer, the term of this patent is extended or adjusted under 35 U.S.C. 154(b) by 461 days.

(21) Appl. No.: 14/117,541

(22) PCT Filed: Jul. 31, 2012

(86) PCT No.: PCT/EP2012/064934
§ 371 (c)(1),
(2), (4) Date: Nov. 13, 2013

(87) PCT Pub. No.: WO2013/017587
PCT Pub. Date: Feb. 7, 2013

(65) Prior Publication Data
US 2014/0322018 A1 Oct. 30, 2014

(30) Foreign Application Priority Data
Aug. 1, 2011 (DE) .......................... 10-2011-080228

(51) Int. Cl.
*F03D 11/00* (2006.01)
*F02N 11/08* (2006.01)
(Continued)

(52) U.S. Cl.
CPC ........... *F02N 11/0818* (2013.01); *B60R 16/03* (2013.01); *F02N 11/08* (2013.01);
(Continued)

(58) Field of Classification Search
CPC .............. F03D 11/0075; F02N 11/08; F02N 11/0866; F02N 11/0818; B60R 16/03; H02J 7/1423; H02J 2001/008; H02J 1/08
See application file for complete search history.

(56) References Cited

U.S. PATENT DOCUMENTS 6,609,889 B1 * 8/2003 Vilsboll ................ F03D 7/0224
415/4.3
7,397,145 B2 * 7/2008 Struve ..................... F03D 1/003
290/55

(Continued)

FOREIGN PATENT DOCUMENTS

DE         97 6081 C     2/1963
DE         31 31505 C2   4/1990
(Continued)

OTHER PUBLICATIONS

"Enercon in Bensersiel, Germany—Location: Westbense, 26427 Bensersiel, Geramany; Construction Complete: Apr. 30, 1996; Commissioned: May 9, 1996", document D4 submitted by Enercon GmbH in Opposition against German Patent No. 102011080228.2.

(Continued)

*Primary Examiner* — Igor Kershteyn
(74) *Attorney, Agent, or Firm* — Norris McLaughlin & Marcus PA (57) ABSTRACT

Locking device for positive locking a rotor of a wind turbine, with a rotor shaft of a drive train rotatably mounted on a machine frame of the wind turbine, a locking disk and a locking bolt, the rotor shaft being non-rotatably connected with the locking disk, which has one or more through-openings for the engagement of the locking bolt, wherein the locking bolt can be substantially locked on the machine frame in a circumferential direction of the rotor shaft, and is arranged on the machine frame for displacement in substantially an axial direction of the rotor shaft, the locking bolt is constructed to be substantially rotationally symmetric about its center axis, in particular cylindrical-shaped, and is supported in a housing, wherein the housing is constructed with an inner hollow-cylindrical seat for receiving the locking bolt and an outer cylindrical shape with a center axis.

7 Claims, 7 Drawing Sheets

(51) Int. Cl.
*B60R 16/03* (2006.01)
*H02J 7/14* (2006.01)
*H02J 1/08* (2006.01)
*H02J 1/00* (2006.01)

(52) U.S. Cl.
CPC .......... *F02N11/0866* (2013.01); *F03D 80/88* (2016.05); *H02J 1/08* (2013.01); *H02J 7/1423* (2013.01); *H02J 2001/008* (2013.01)

(56) References Cited

U.S. PATENT DOCUMENTS

| | | | |
|---|---|---|---|
| 7,948,100 B2 * | 5/2011 | Nies | F03D 1/003 290/44 |
| 2006/0196288 A1 * | 9/2006 | Aust | F03D 1/003 74/411.5 |
| 2008/0150292 A1 * | 6/2008 | Fedor | F03D 1/04 290/55 |
| 2010/0021299 A1 * | 1/2010 | Aarhus | F03D 1/003 416/31 |
| 2010/0194114 A1 | 8/2010 | Pechlivanoglou et al. | |
| 2011/0135481 A1 | 6/2011 | Koronkiewicz | |
| 2012/0045340 A1 * | 2/2012 | Holling | F03D 7/0248 416/220 R |
| 2012/0070304 A1 * | 3/2012 | Nielsen | F03D 1/003 416/244 R |

FOREIGN PATENT DOCUMENTS

DE  20 2007 018565 U1  11/2008
DE  10 2007 058746 A1  12/2008

OTHER PUBLICATIONS

"Enercon in Dornumersiel, Germany—Location: 26553 Dornumersiel, Germany; Construction Complete: Dec. 28, 1994; Commissioned: Jan. 9, 1995", document D5 submitted by Enercon GmbH in Opposition against German Patent No. 102011080228.2.

"Enercon in Egeln, Germany—Location: 39435 Egeln, Germany; Construction Complete: Aug. 23, 2002; Commissioned: Oct. 1, 2002", document D6 submitted by Enercon GmbH in Opposition against German Patent No. 102011080228.2.

"Enercon in Egeln, Germany—Location: 39435 Egeln, Germany; Construction Complete: Aug. 23, 2002; Commissioned: Oct. 1, 2002", document D7 submitted by Enercon GmbH in Opposition against German Patent No. 102011080228.2.

"Tolerance (Engineering)—Difference between revisions" by Wikipedia (DE) (accessed Mar. 3, 2015)—document D11 submitted by Enercon GmbH in Opposition against German Patent No. 102011080228.2.

International Search Report Dated Oct. 24, 2012, Mailed Nov. 2, 2012.

English Translation of International Search Report Dated Oct. 24, 2012, Mailed Nov. 2, 2012.

* cited by examiner

LOCKING DEVICE FOR WIND TURBINES

This application is a 371 application of PCT/EP2012/064934 filed Jul. 31, 2012, which claims foreign priority benefit under 35 U.S.C. §119 of German application 10 2011 080 228.2 filed Aug. 1, 2011.

The invention relates to a locking device for the rotor of a wind turbine having one or more rotor blades rotating about a substantially horizontal rotor axis under the action of wind. The rotor shaft is supported on a machine frame in a nacelle and transmits its rotation either directly or via an intermediate transmission to a generator which converts the rotational energy into electrical energy. The nacelle is turn located on a tower to which it is connected by a so-called azimuth bearing. The azimuth bearing allows rotation of the nacelle about an additional substantially vertical axis, and thus the orientation of the rotor according to the prevailing wind direction.

For safety reasons, it is imperative that the rotor—and hence all rotating parts—can be locked against further rotation relative to the nacelle by way of a positive connection. This locking occurs, for example, when work is performed inside the hub of the rotor or inside the nacelle and is intended to minimize the hazards for the people involved. Such positive connection is typically produced by installing a locking disk on the rotor shaft in a rotation-locked manner. This locking disk has one or more through-openings. A displaceable bolt is disposed on the machine frame or another fixed component in the nacelle, wherein the bolt passes in an extended position (closed position) through one of the through-openings of the locking disk, thereby producing a positive, non-rotatable connection. Since the connection subjected to large forces when exposed to wind and other external effects when the rotor is locked, bolts and openings have preferably matching cross-sections so as to accommodate the forces as evenly as possible over a large area. In the retracted position (open position), the bolt releases the opening of the locking disk and enables unimpeded rotation of the rotor.

Such a locking device is disclosed, inter alia, in DE 10 2004 013 624 A1 and DE 10 2007 058 746 A1.

DE 10 2004 013 624 A1 describes a process wherein the rotor is stopped in a rotation position where the opening is at a position in space where the bolt can pass through the opening during its displacement. For this purpose, a marking is applied on the locking disk, which is detected by a position sensor.

DE 10 2007 058 746 A1 also describes a method for determining the position of the rotor so as to allow engagement of the bolt in an opening and suggests for this purpose the use of sensors measuring the rotation speed of the rotor shaft.

The conventional solutions have in common that they suggest stopping the rotor in a particular position, where the opening and the bolt are aligned with each other, so that the bolt can engage in the opening. To ensure a most efficient transmission of force as well as a safe and backlash-free locking of the rotor relative to the nacelle, the respective cross-sectional shapes and dimensions of the bolt and opening of the locking disk are designed to substantially match and are arranged so that the cross-sectional shapes have the same orientation. When the cross-sectional shapes are different, the forces are transmitted only at points, increasing stress of the components, in particular in the region of the respective force application, but also beyond via the stress profile, and therefore reducing durability or increasing demands on materials, sizing and processing and hence increasing costs.

The same applies to differences in the cross-sectional dimensions. When the bolt is smaller than the opening, forces are likewise transmitted only at certain points, with the consequences described above. Moreover, play exists between the two components, allowing the rotor to move, albeit to a lesser degree. This movement is undesirable for two reasons. On one hand, each movement of the rotor represents a hazard for persons in the nacelle; on the other hand, the force applied to the bolt due to the rotation of the rotor is in this case not uniform, but jerky. Such jerks and impacts place significantly higher demands on the bolt, also with the consequences described above.

For these reasons, bolts and opening ideally have matching cross-sectional shapes and dimensions and orientation. A circular cross-sectional shape has hence found wide-spread use due to ease of production and substantial position-independence.

A disadvantage of the prior art is that the illustrated complete match cannot be achieved in practice and also does not make sense. The differences in the desired or nominal dimensions in production alone prevent a complete match. Eliminating or at least reducing these deviations to an exceptionally low level results in disproportionately high cost. However, should a complete match be successful, this would complicate the insertion of the bolt into the opening, since all surfaces are in full contact with each other, causing friction forces, and moreover even the smallest angular deviation from the ideal insertion direction would result in jamming and wedging.

It is an object of the invention to provide a locking device, which obviates the disadvantages of the prior art, and which in particular ensures a reliable and substantially unimpeded insertion of the bolt into the openings of the disk, and reduces play between the bolt and the opening.

This object is attained with a locking device as described herein, by providing adjusting means between the locking bolt and the rotor axis effective in the radial direction, whereby the distance of the locking bolt with respect to the rotor shaft is adjustable at least in the radial direction. Surprisingly, it has been observed that the engagement and alignment between locking bolts and openings does not only depend on the respective rotational position of the rotor. In fact, there are other factors that determine whether the engagement of the bolt in the opening is successful: Based on manufacturing and assembly tolerances of the individual components of the wind turbine, there are deviations in the radial distance between the center axis of the locking bolt and the axis of the rotor shaft. These multiple deviations from different sources cannot be compensated or eliminated at all in production or only with disproportionate high cost. The teaching of the invention allows for the first time an adjustment of the radial distance between the locking bolt and rotor shaft during installation or during maintenance, so that the radial component of the alignment between the locking bolt and opening can be optimized.

Those deviations which are inevitable and undesirable are hereby compensated. This applies to the deviation in alignment between the center axis of the bolt or its displacement direction and the openings in the locking disk disposed on the rotor axis. These deviations may occur in two directions, in each case essentially perpendicular to the center axis of the rotor shaft. The terminology used below relating to an axial direction, radial direction, circumferential direction and references to top and bottom are with respect to the rotation axis of the rotor of the wind turbine. Moreover, the direction that is substantially perpendicular to the center axis of the rotor shaft and extends in a plane with the axis of the tower is referred to as vertical, whereas the direction that is perpendicular to the center axis of the rotor shaft and substantially perpendicular to the axis of the tower is referred to as horizontal.

In a preferred embodiment, the bolt has a cylindrical configuration and is accordingly arranged in a hollow-cylindrical seat of the housing. The outer shape of the housing is also rotationally symmetric, preferably cylindrical, wherein the center axes of the rotational symmetry of the outer shape and the center axis of the recess of the housing are offset from each other by a predetermined amount. The locking bolt is hence eccentrically supported in the housing. The housing is in turn mounted on the machine frame so that the housing can rotate about its rotation axis and the housing can be locked in a desired rotation position. By the rotation of the housing, the axis of the bolt is displaced both horizontally and vertically and thus shifted relative to the center axis of the rotor shaft. Substantially for each position, two positions may be adjusted in the other direction perpendicular thereto. The inevitable displacement in the other direction that is perpendicular to the intended adjustment direction is without any additional consequences, as this displacement is compensated by the rotation of the locking disk. In this manner, a spatially matching arrangement of bolt and opening can be achieved and the distance between the locking disk and rotor shaft can be adjusted in the radial direction.

This embodiment has the further advantage that the displacement of the locking bolt can be repeated at any time without great effort. This may be necessary when individual components undergo deformations or changes in position during operation.

In another embodiment, at least one spacer element having various dimensions can be disposed between the bolt housing and the machine frame, which affect the distance to the machine frame and thus the position of the bolt axis in space.

Both embodiments have in common that the adjustment cannot be made only once during the initial installation, but that re-adjustments can also be made later, for example when the shape of the components has changed as a result of stresses during operation. The first-described embodiment has here the advantage that the adjustment can be performed without requiring additional components, whereas the last-described embodiment it requires that suitable spacer elements are available.

Another object of the invention is a wind turbine with a locking device that is adjustable in the manner described above.

Further details of the invention will become apparent from the drawings with reference to the description.

Figure 1:
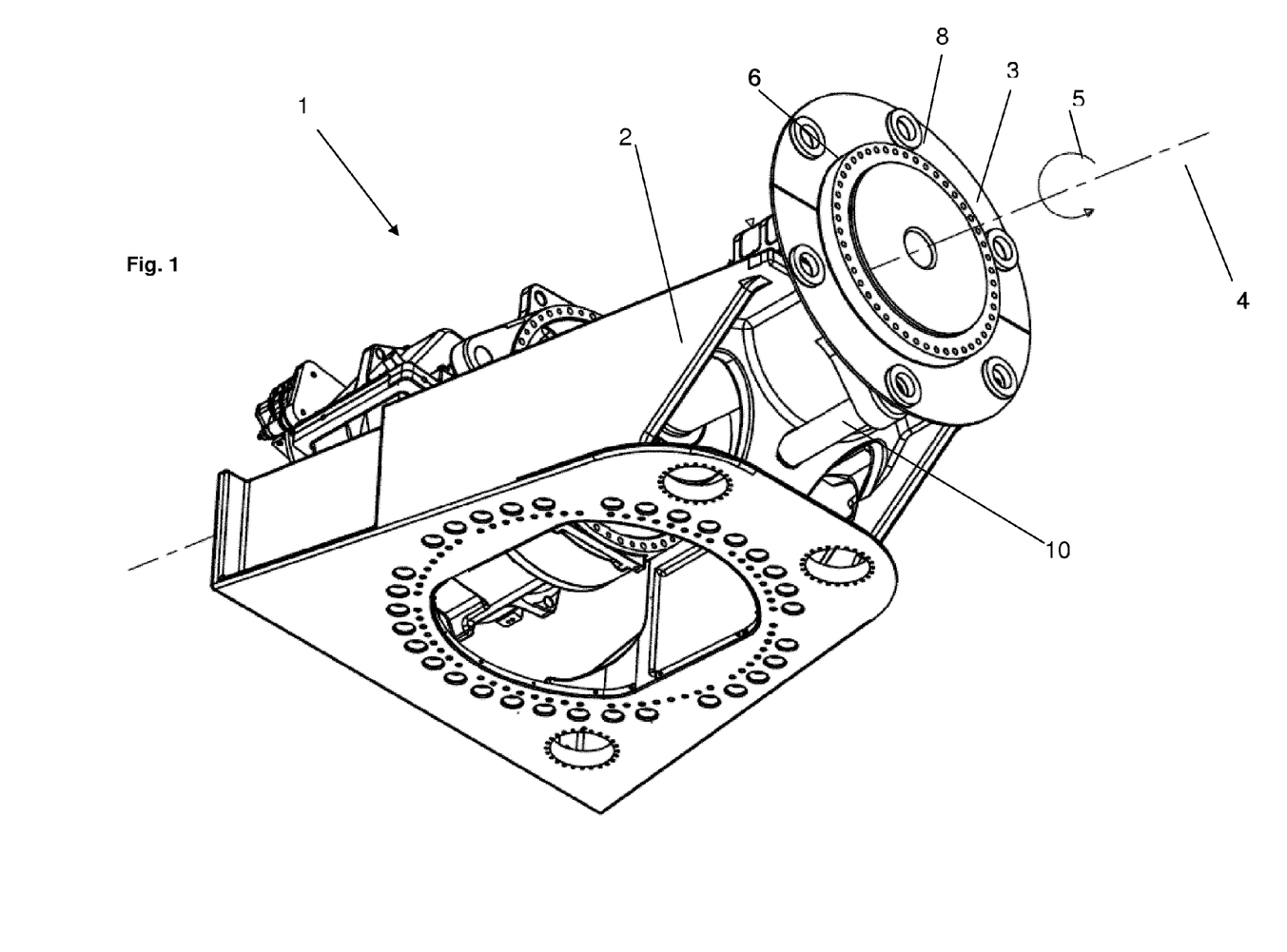
FIG. 1 a perspective view of a machine frame and a locking disk mounted on the rotor shaft, FIG. 2 an axial top view onto the locking disk mounted on the rotor shaft, FIG. 3 a schematic diagram of the locking device, FIG. 4 a side view of machine frame, locking disk and rotor hub with a cross-section through the locking device, FIG. 5 an enlarged cross-sectional view through the locking device, FIG. 6 a schematic diagram of the cross-section of the locking device, FIG. 7 an exploded view of machine frame, rotor shaft with rotor shaft bearing and locking device, and FIG. 8 a wind turbine with a locking device.

FIG. 1 shows the arrangement of the essential parts of the locking device 1. The machine frame 2 is pivotally connected to the upper end of a tower 32. The rotor shaft 3, which can rotate about its longitudinal axis 4 in the direction of rotational arrow 5', is supported on the machine frame 2. The rotation of the rotor shaft 3 is introduced by an unillustrated rotor hub 14 arranged in this view to the right. A locking disk 6 is mounted on the rotor shaft 3.

The locking disk 6 is in this case constructed in two parts, but the locking disk 6 may also be constructed in one piece or in several pieces. The locking disk 6 has a plurality of through-openings 7. These through-openings 7 are formed so that the locking bolt 10 (not visible here) can engage in the through-openings 7 so as to prevent a rotational movement about the longitudinal axis 4 of the rotor shaft 3 between the locking disk 6 and the rotor shaft 3. The through-openings 7 are equipped with bushings 9 for higher strength and better engagement of the locking bolt 10.

The housing 10 of the locking device 1 accommodating the locking bolt 11 is arranged below the rotor shaft 3.

Figure 2:
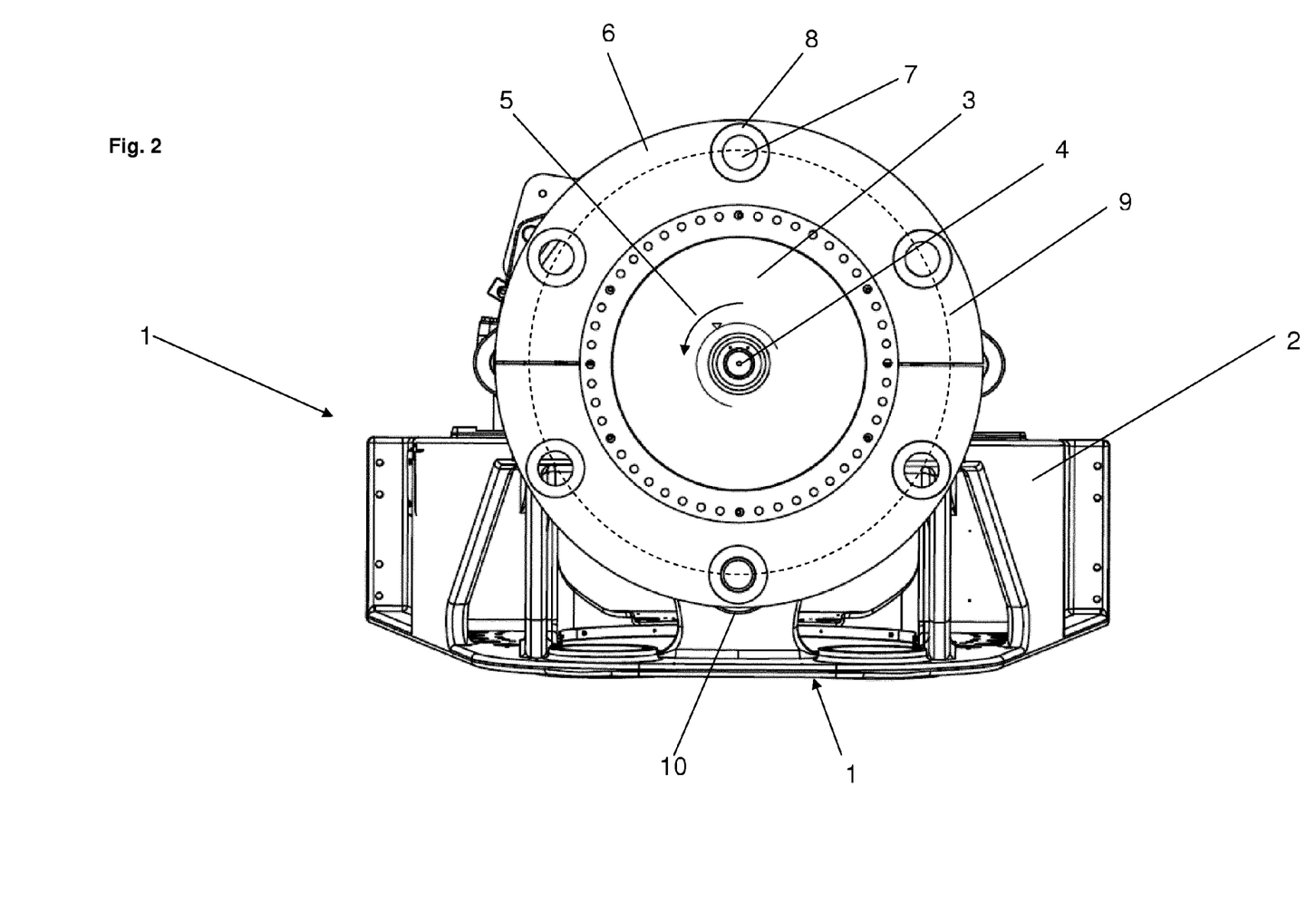

FIG. 2 shows a top view onto the locking device 1 as seen from the rotor hub 14. As can be seen, the plurality of through-openings 7 in the locking disk 6 is located on a circular line 9 with the longitudinal axis 4 of the rotor shaft 3 forming the center. It can also be seen that the locking bolt 11 which is guided in the housing 10 is aligned with one of the through-openings 7.

Figure 3:
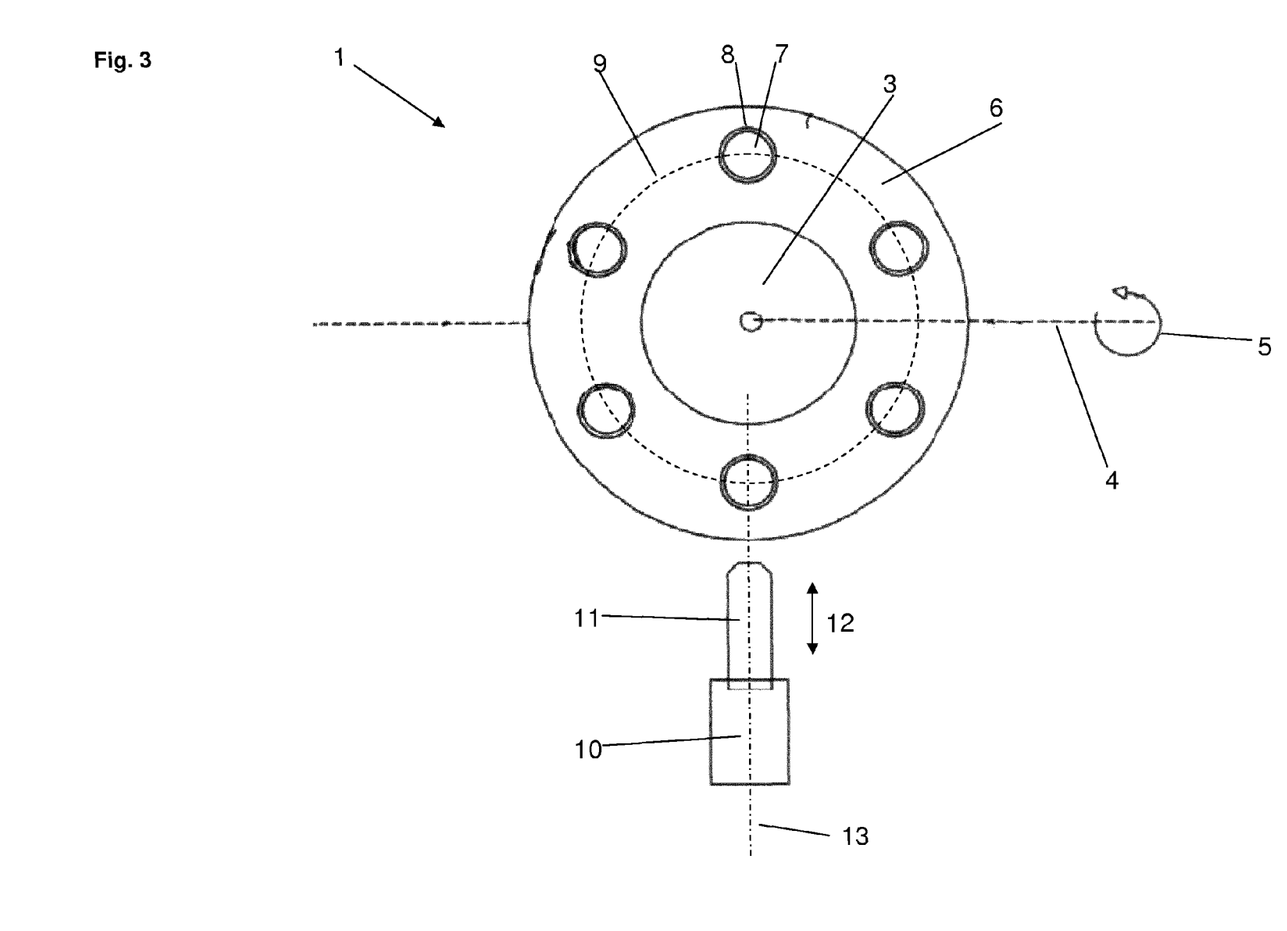

FIG. 3 shows a schematic diagram of the cooperation of the individual parts of the locking device 1. The locking bolt 10 supported in the housing 11 is displaceable in the axial direction 12, i.e. along a straight line in the direction of the double arrow 12. In its extended position, the locking bolt 11 passes through one of the through-openings 7 of the locking disk 6 and thus produces a positive connection which prevents further rotation of the locking disk 6 and the rotor shaft 3 which is non-rotatably connected to the locking disk 6 about its longitudinal axis 4.

Figure 4:
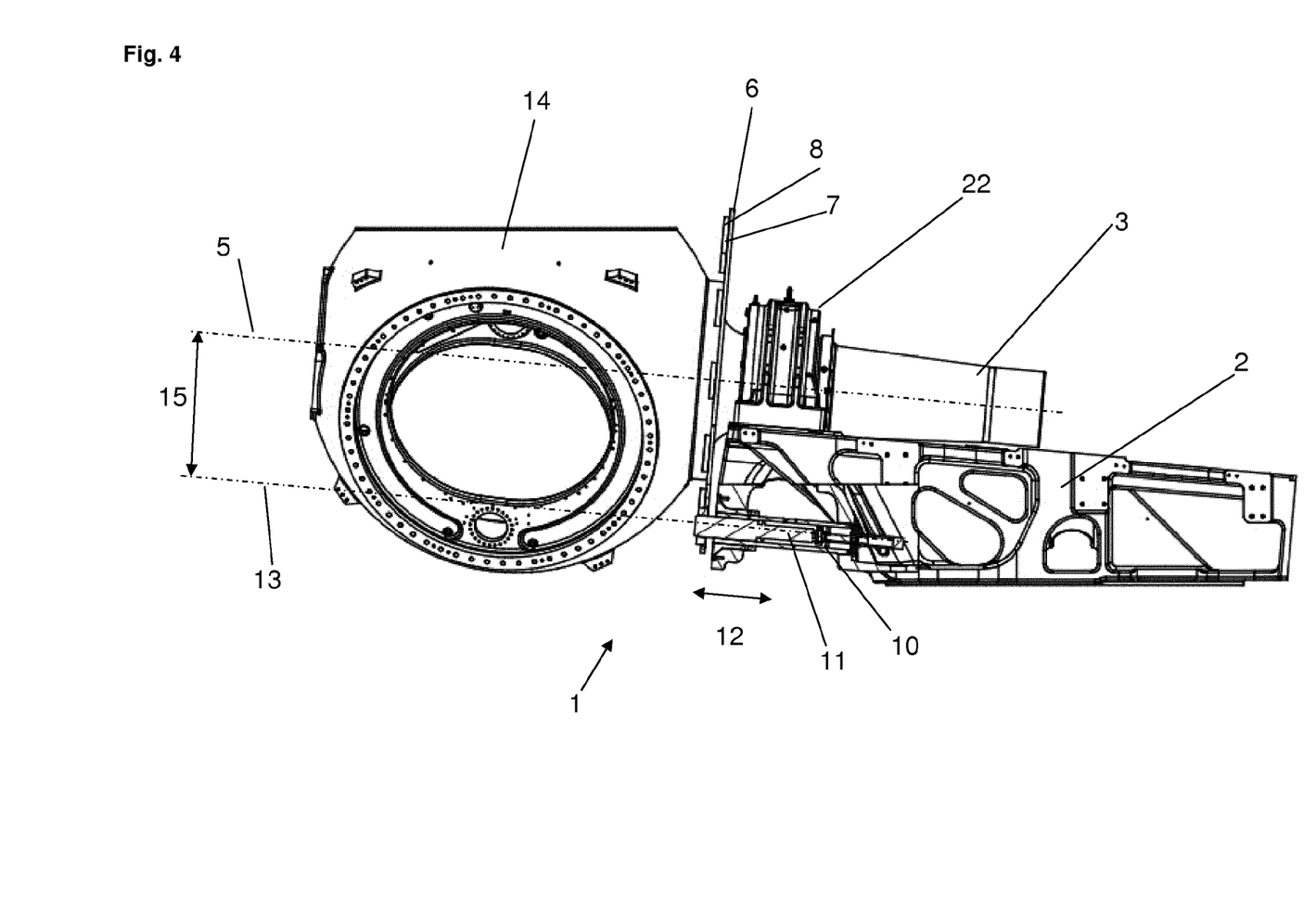

FIG. 4 shows the cooperation of the individual components of the locking device 1. The rotor shaft 3 is supported on the machine frame 2. The locking disk 6 is non-rotatably arranged on the rotor shaft 3. In the present view, the hub 14 of the rotor is arranged directly on the left of the rotor shaft 3. Additional unillustrated subassemblies, e.g. in gearbox and a generator, are arranged on the side opposite the rotor hub 14 and to the right in the present view. These components form the drive train 27 of wind turbine 31. It should be emphasized that the present invention also includes types of wind turbines without a gearbox and/or wind turbines having a different support.

The housing 10, in which the locking bolt 11 is displaceably mounted in the direction of the double arrow 12, is arranged on the underside of the main frame 2. A spacing 15 exists between the longitudinal axis 4 of the rotor shaft 3 and the center axis 14 of the locking bolt 11.

Figure 5:
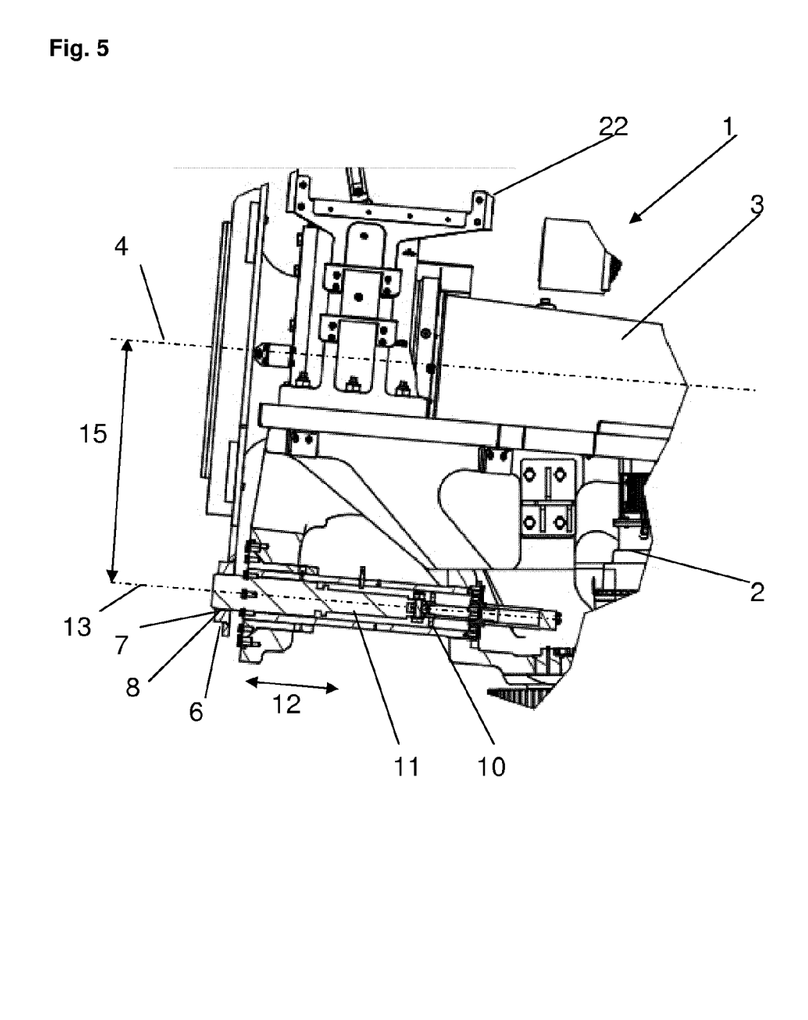

FIG. 5 shows an enlarged section through the housing 10 and the locking bolt 11, whereby the locking bolt 11 is in its extended position, i.e. to the left in the illustrated view. As can be seen, the locking bolt 11 passes through the through-opening 7 and the bushing 8 in the locking disk 6 and thus produces a positive fit. The spacing 15 between the longitudinal axis 4 of the rotor shaft 3 and the center axis 14 of the locking bolt 11 can also be seen.

The positions of the through-openings 7 in the locking disk 6 are permanently defined in production, so that the position of the through-openings 7 and the locking bolts 11 must be compensated by changing the spacing 15 between the longitudinal axis 4 of the rotor shaft 3 and the center axis 14 of the locking bolt 11.

Figure 6:
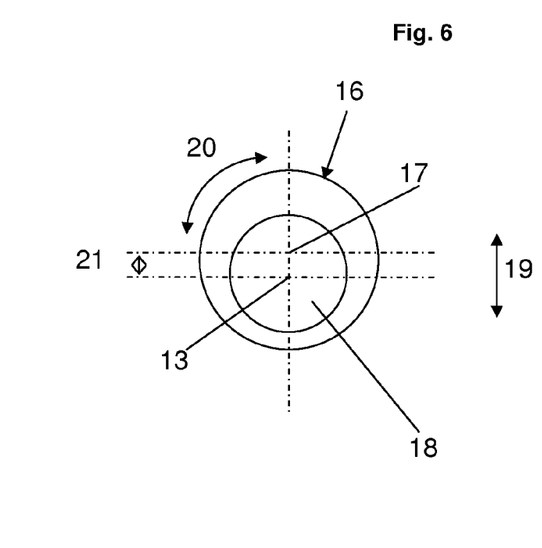

FIG. 6 shows in a schematic diagram a preferred embodiment, wherein the spacing 15 is variable. The center axis 13 of the locking bolt 11 can then be aligned with the through-openings 7. Illustrated is a cross section through the housing 10 and the locking bolt 11. The housing 10 has on its outer side a rotationally symmetric cross-section 16 about a center axis 17. The three-dimensional configuration of the housing 10 is thus essentially a cylinder. As viewed in cross-section, a likewise rotationally symmetric seat 18 for receiving the locking bolt 11 is located in the housing 10. The seat 18 thus forms a substantially cylindrical cavity inside the housing 10. The center axis of the receptacle 18 corresponds to the center axis 13 of the locking bolt 11 and is offset relative to the center axis 17 of the housing section 16, forming an eccentric with eccentricity 21. A rotation of the housing 10 in the direction of double-headed arrow 20 about its center axis 17 causes a shift of the seat 18 and thus of the locking bolt 11. In this way, the locking bolt 11 and the through-openings 7 in the locking disk 6 can be aligned. It should be noted that only the displacement 19 of the locking bolt 11 in the vertical direction is significant inside the housing 10. A displacement in the horizontal direction is not required and also not relevant, as such displacement is produced by the rotation of the locking disk 6 about the longitudinal axis 4 of the rotor shaft 3.

After an adjustment, the housing 9 is locked against a new inadvertent rotation. This locking is not shown here and is preferably produced by a frictional connection. It is also conceivable to use form-fitting means, especially those means that allow different setting positions in small increments.

Figure 7:
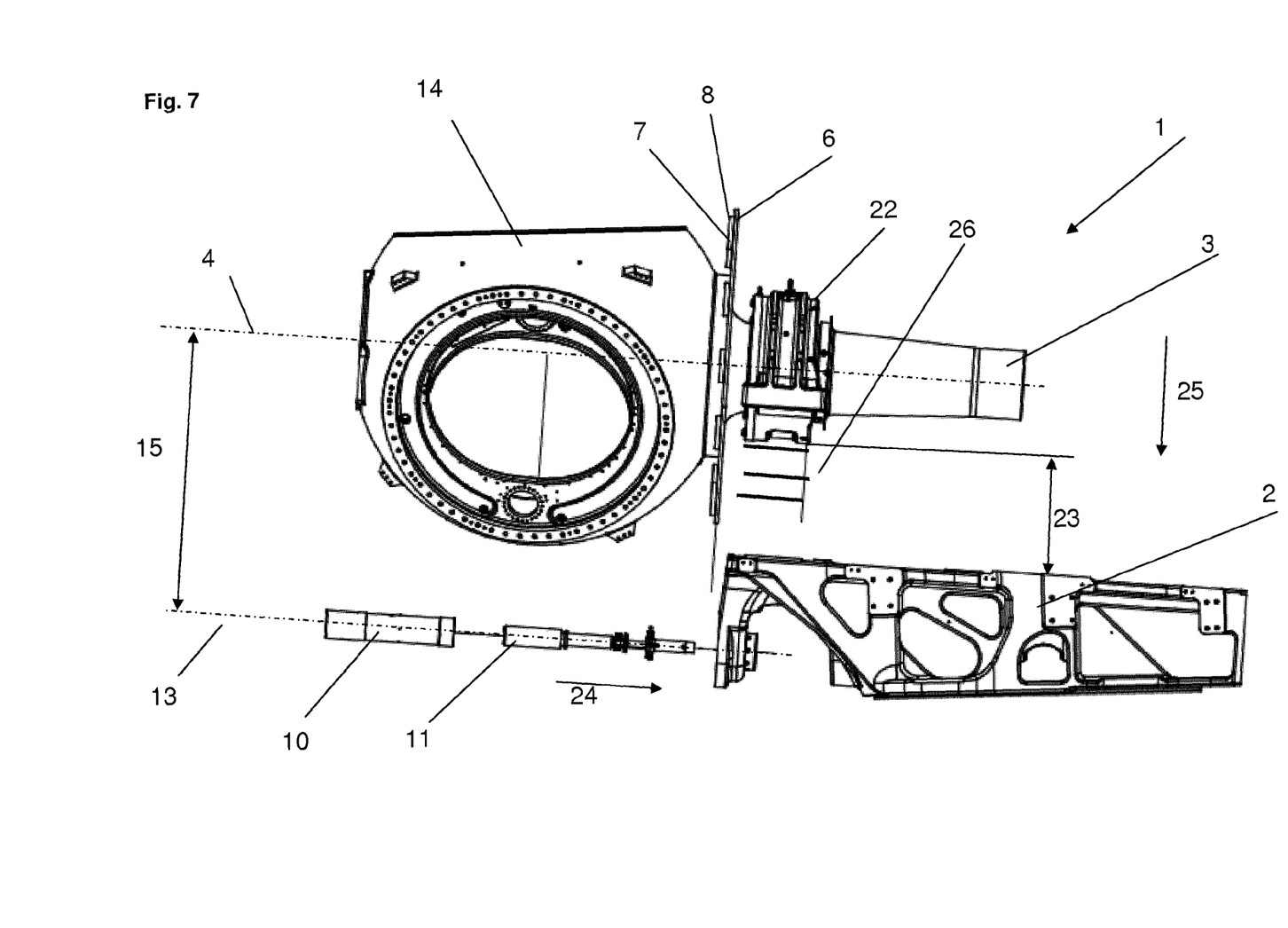

FIG. 7 illustrates an alternative embodiment for varying the vertical spacing 15 between the longitudinal axis 4 of the rotor shaft 3 and the center axis 13 of the locking bolt 11. Housing 10' and locking bolt 11 are inserted in the direction of the arrow 24 into appropriate seats in the machine frame 2. The housing 10' is here constructed without eccentricity, so that the center axis 17 of the housing 10' and the center axis 13 of the locking bolt 11 coincide.

The rotor shaft 3 is placed on the machine frame 2 in the direction of arrow 24 and is connected therewith via the bearing 22. The spacing 15 between the longitudinal axis 4 of the rotor shaft 3 and the center axis 13 of the locking bolt 11 is defined by inserting one or more spacer elements 26 between the bearing 22 and the machine frame 2. The spacer elements 26 can have different thicknesses. The total thickness of the interposed spacer elements 26 determines the spacing 23 between the machine frame 2 and the bearing 22 of the rotor shaft 3 and hence also the spacing 15 between the longitudinal axis 4 of the rotor shaft 3 and the center axis 13 of the locking bolt 11. Since the position of the through-openings 7 in the locking disk 6 is fixed in relation to the longitudinal axis 4 of the rotor shaft 3, the position of the through-openings 7 relative to the locking bolt 11 is thus also defined, so that locking bolts 11 and the through-openings 7 are in alignment. The spacing 15 can thus be adjusted at least during assembly of the wind turbine 31.

Figure 8:
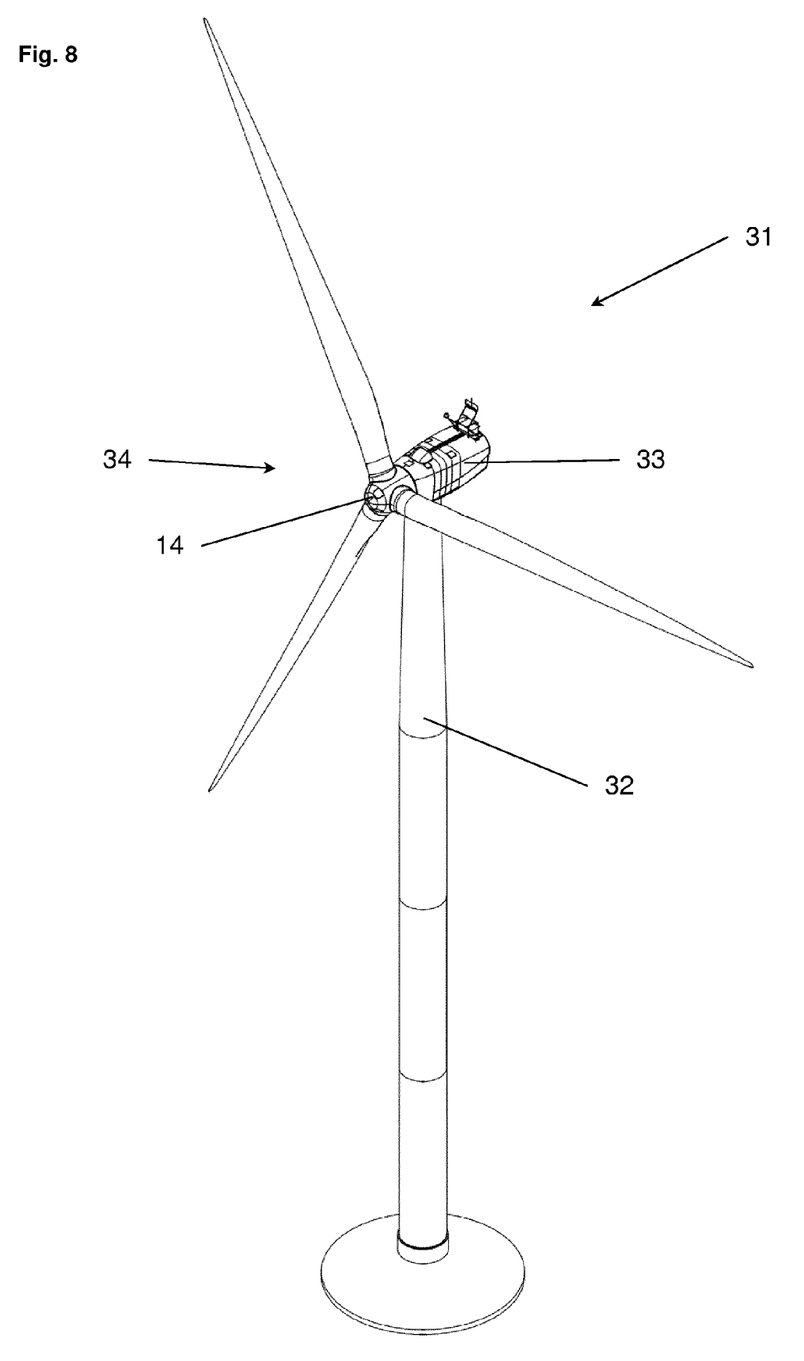

FIG. 8 shows a wind turbine 31 with a tower 32, with a nacelle 33 rotatably supported on the tower 32 for rotation about a tower axis of the tower 32 and a rotor 34 connected via a rotor shaft 3 to a generator arranged in the nacelle 8. When tracking the wind—also referred to as "yawing"—, the nacelle 33 is rotated about the tower axis of the tower 32 in the horizontal plane, so as to rotate the rotor 34 perpendicular into the wind and thus maximize the energy yield.

The combinations of features disclosed in the aforedescribed embodiments are not intended to limit the invention; instead, the characteristic features of different embodiments can also be combined.

| List of reference symbols | |
|---|---|
| 1 | Locking device |
| 2 | Machine frame |
| 3 | Rotor shaft |
| 4 | Longitudinal axis rotor shaft |
| 5 | Rotation direction rotor shaft |
| 6 | Locking disk |
| 7 | Through -opening |
| 8 | Bushing |
| 9 | Circular line |
| 10 | Housing |
| 10' | Housing |
| 11 | Locking bolt |
| 12 | Movement locking bolt/axial direction |
| 13 | Center axis locking bolt |
| 14 | Rotor hub |
| 15 | Spacing |
| 16 | Cross-section housing |
| 17 | Center axis housing |
| 18 | Seat |
| 19 | Displacement locking bolt/radial direction |
| 20 | Rotation housing |
| 21 | Eccentricity |
| 22 | Bearing rotor shaft |
| 23 | Spacing bearing - machine frame |
| 24 | Installation direction housing |
| 25 | Installation direction bearing/rotor shaft |
| 26 | Spacer elements |
| 27 | Drivetrain |
| 28 | Cylindrical shape |
| 29 | Circumferential direction |
| 30 | Recess of the machine frame |
| 31 | Wind turbine |
| 32 | Tower |
| 33 | Nacelle |
| 34 | Rotor |

The invention claimed is:

1. Locking device for positive locking a rotor of a wind turbine,
    with a rotor shaft of a drive train rotatably mounted on a machine frame of the wind turbine,
    a locking disk and a locking bolt,
    wherein the rotor shaft non-rotatably connected with the locking disk,
    which has one or more through-openings for the engagement of the locking bolt,
    wherein the locking bolt can be substantially locked on the machine frame in a circumferential direction of the rotor shaft,
    and is arranged on the machine frame for displacement in substantially an axial direction of the rotor shaft,
    the locking bolt is constructed to be substantially rotationally symmetric about its center axis, and is supported in a housing,
wherein
    the housing is constructed with an inner hollow-cylindrical seat for receiving the locking bolt and an outer cylindrical shape with a center axis, wherein the center axis of the seat and the center axis of the outer cylindrical shape are offset from one another, whereby the spacing of the locking bolt relative to the rotor shaft is adjustable at least in a radial direction.

2. Locking device according to claim 1, wherein the housing is arranged in a recess of the machine frame, wherein the recess and the housing are constructed such that the rotational position of the housing relative to its center axis in the recess can be adjusted and locked against unintentional rotation.

3. Locking device according to claim 2, wherein the housing is locked by a frictional connection.

4. Locking device according to claim 1, wherein the adjusting means are constructed as at least one spacer element, wherein the at least one spacer element can be effectively arranged at a transition between the housing and a bearing of the rotor shaft.

5. Locking device according to claim 4, wherein spacer elements having different dimensions can be arranged for insertion or removal between the locking bolt or the housing, and the machine frame.

6. Wind turbine with a locking device according to claim 1.

7. The Locking device according to claim 1, wherein the locking bolt is constructed to be cylindrical-shaped.

* * * * *